Patented Jan. 9, 1945

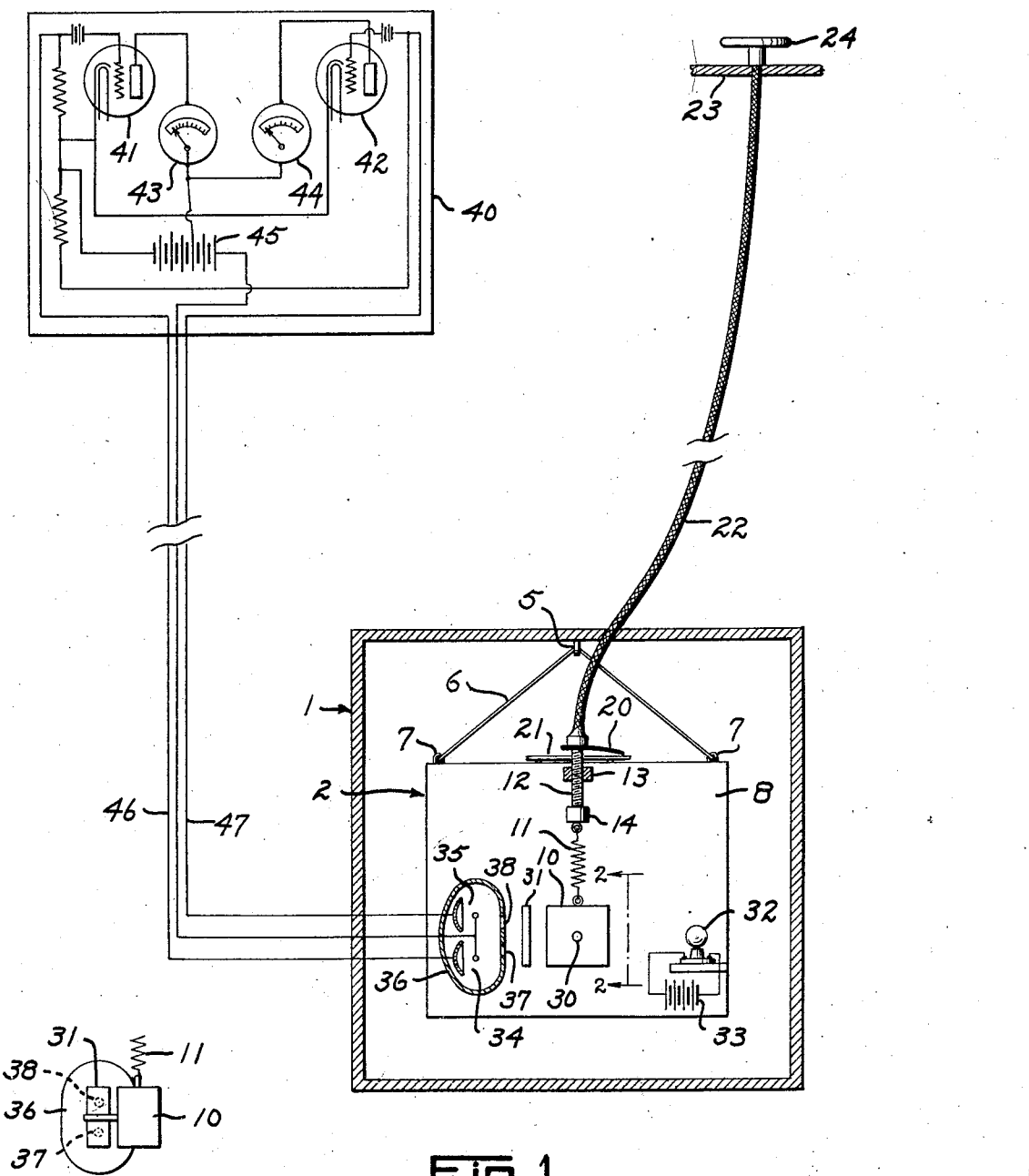

2,367,126

UNITED STATES PATENT OFFICE 2,367,126

GRAVIMETER NULL INDICATOR

Patrick H. James, Houston, Tex.

Application December 19, 1940, Serial No. 370,805

3 Claims. (Cl. 73—382)

This invention relates to a force measuring device and more particularly to a remotely controlled adjusting and indicating device for gravimeters. The invention is of particular utility in the field of gravimetric prospecting in that it facilitates the making of gravimetric measurements at the submerged surface in water covered areas.

In accordance with the invention a pair of closely spaced light sensitive elements or photoelectric cells are substituted for the telescopic mechanism ordinarily utilized for making visual observations of the position of rest of the moving system of a gravity measuring instrument. The light sensitive elements serve to scan the scale of the instrument and hence the shadow or beam of light, whichever is used, and which moves across the scale affects the respective light sensitive elements in accordance with the position of such shadow or beam of light. The amount of the effect produced upon the light sensitive elements is determinable at a point remote from the instrument by means of a composite electric circuit which includes indicating means for the respective light sensitive elements.

It is also contemplated that the device of the invention shall include means for adjusting the gravimeter to obtain any desired setting thereof, preferably a null setting as such setting may be accurately obtained in accordance with the invention.

An object of the invention is to provide a gravity measuring system including mechanism for affecting desired adjustments of the gravimeter from a point remote from the instrument.

Another object is to provide an instrument having a moving system which is adapted by its movements to control the amount of light impinging upon the respective light sensitive elements of a plurality of such elements used in the system.

Still another object is to provide a gravity measuring system in which the gravimeter may be located upon the surface in a submerged area and means is provided for observing at the surface of the submerging medium the position of the moving system of the gravimeter.

A further object is to provide a device of the class described including means operable from the surface of the submerging medium for measurably adjusting the moving system to a predetermined position, the amount of such adjustment being a measure of the change in the gravimetric force of attraction necessitating such change in order to return the moving system to such predetermined position.

The foregoing objects are primary objects and will, together with other objects, be more fully apparent from a consideration of the following description taken in connection with the accompanying drawing in which:

Fig. 1 is a diagrammatic view showing the gravimeter and the controlling instrumentalities therefor;

Fig. 2 is an elevational view taken on line 2—2 in Fig. 1.

In Fig. 1 of the drawing the reference character 1 represents a casing or housing which is water tight in order that it may be lowered through a submerging medium to a submerged surface and, while so submerged, will protect the enclosed gravity measuring instrument 2 from moisture. It is to be understood that the casing 1 may be provided, in a well known manner, with suitable openings and closures therefor and/or windows to provide physical or visual access to the interior of the casing. As these features are well known in the art and form no part of the invention they are not shown in the drawing.

Interiorly of the casing 1 there is provided a supporting eye 5 through which a supporting cable 6 passes. This cable is attached through the ears 7 to the gravimeter housing 8 so that the freely suspended instrument will assume a level position when the casing 1 is placed upon a submerged surface. The gravimeter 2 may be of any well known type and is shown as comprising a mass or moving system 10 supported upon a suspension spring 11 attached at its upper end to an adjustable support comprising a member 12 threadedly passing through a support member 13 fixed in the housing 8. The head 14 to which the spring 11 is attached is swivelly connected to the lower end of the member 12 so that rotation of the member 12 will serve only to change the vertical position of the mass 10.

It is to be understood that the position assumed by the mass 10 is a measure of the force of gravity acting thereon. Alternatively any change in such position is indicative of the variations in gravity between the two points where such change takes place. This change may be ascertained by direct observation or, if desired, the member 12 may be rotated to return the mass to a predetermined position and in such event the rotation of the member 12 constitutes a measure of the change in the force of gravity giving rise to the displacement of the mass 10 from such position.

A pointer 20 attached to the upper end of the member 12 moves over a graduated dial 21 and indicates the amount of adjustment necessary to bring the moving system to the predetermined position. This adjustment is effected in the present invention by means of a flexible shaft 22 which sealably passes through the casing 1 and terminates at a point remote therefrom, as for example at the panel 23 within a boat (not shown) upon the surface of the submerging medium. A knob 24 is attached to the flexible shaft 22 so that the desired rotational effort may be imparted through the flexible shaft 22 to the member 12.

As shown in the drawing the mass 10 is provided with a projection or pointer 30 to move therewith and cast a shadow upon the scale 31 as such pointer moves in the beam of light from the lamp 32 illuminated as by means of a battery 33 within the housing 8. It seems apparent that a screen having a slot therein may be substituted for the pointer 30 in which case a narrow beam of light will be cast upon the scale 31 in the stead of the shadow which is cast by the pointer 30 as above explained.

Ordinarily the position of the shadow or beam of light upon the scale 31 is observed by means of a telescope. This method of observation is impractical where it is preferable that observations be made at a distance from the instrument when such instrument is placed upon the submerged surface. Accordingly the present invention contemplates the use of light sensitive means in the stead of a telescope, such means being so constructed that observations can be made at a point remote from the instrument itself and preferably at a point proximate the control knob 24.

In the illustrated embodiment of the invention the mechanism just referred to comprises a pair of closely juxtaposed light sensitive elements which are shown at 34 and 35 as enclosed within a single housing 36 having closely spaced windows 37 and 38 proximate the scale 31.

At the point of observation there is provided an indicating instrument 40 which includes vacuum thermionic tubes 41 and 42 of which the plates are connected respectively to current indicating instruments 43 and 44. The other terminals of these instruments are connected to the battery 45 which is also connected to the common terminal of the light sensitive elements 34 and 35. The other terminals of the light sensitive elements 34 and 35 are connected respectively by means of conductors 46 and 47 to the grids of the tubes 41 and 42.

In the operation of the system above described the movement of the pointer 30 within the light beam from the source 32 varies the amount of light entering the openings 37 and 38 in the housing of the light responsive elements 34 and 35. This variation in the amount of light admitted to the elements 34 and 35 will cause corresponding fluctuations in the readings of the meters 43 and 44 and by means of these changes in readings the instrument 40 indicates the departure of the mass 10 from a mean position. Accordingly it is possible through a tabulation of the readings of the meters 43 and 44 to determine the variations in gravity as the gravity measuring instrument 2 is moved from point to point.

As indicated above, however, the preferable manner of making observations by means of the instrumentalities above described is by means of rotation of the knob 24 and associated elements whereby the mass 10 is returned to a predetermined position, preferably the position indicated in the drawing whereby the shadow of the pointer 30 falls upon the casing 36 intermediate the openings 37 and 38 therein. In such event an equal amount of light is directed through the openings 37 and 38 and hence the meters 43 and 44 indicate an equal current flowing in the plate circuits of the thermionic tubes 41 and 42. It is to be understood, of course, that by unbalancing of the respective circuits in the instrument 40 different reading of the meters 43 and 44 will occur when the condition of balance is obtained.

While the foregoing description is directed primarily to the preferred embodiment of the invention, it is to be understood that the invention is not confined to the specific construction disclosed since the invention broadly comprehends a gravity measuring system which includes mechanism for obtaining the desired gravimeter adjustments and/or readings at a point remote from the instrument.

What is claimed is:

1. A device for determining forces of gravity over submerged areas which comprises a housing to be submerged, a mass therein movable as a function of the force of gravity thereon, a freely swinging support in said housing, a pair of light responsive elements and a source of light therefor also carried by said support, means operable by movement of the mass to affect the light cast by said source upon said responsive means, additional means suspending said mass in said support so that the force of gravity will effect movement of the mass and consequent movement of said first means, and means on the surface to indicate such movement as an indication of the force of gravity at the location.

2. A device for determining forces of gravity over submerged areas which comprises a housing to be submerged, a mass therein movable as a function of the force of gravity thereon, a freely swinging support in said housing, a pair of light responsive elements and a source of light therefor also carried by said support, means operable by movement of the mass to affect the light cast by said source upon said responsive means, additional means suspending said mass in said support so that the force of gravity will effect movement of the mass and consequent movement of said first means, and means on the surface to indicate such movement as an indication of the force of gravity at the location, said additional means including an adjustment to move the mass vertically to set it for a null reading by operation from the surface.

3. A device for determining forces of gravity over submerged areas which comprises a housing to be submerged, a mass therein movable as a function of the force of gravity thereon, a freely swinging support in said housing, a pair of light responsive elements and a source of light therefor also carried by said support, means operable by movement of the mass to affect the light cast by said source upon said responsive means, additional means suspending said mass in said support so that the force of gravity will effect movement of the mass and consequent movement of said first means, and means on the surface to indicate such movement as an indication of the force of gravity at the location, said additional means including an adjustment to move the mass vertically to set it for a null reading by operation from the surface including a threaded spindle and a flexible connection to the surface.

PATRICK H. JAMES.